US012669564B2

(12) United States Patent
Li et al.

(10) Patent No.: US 12,669,564 B2
(45) Date of Patent: Jun. 30, 2026

(54) DIRECTION OF ARRIVAL ESTIMATION METHOD AND SYSTEM FOR SPARSE ARRAY BASED ON VANDERMONDE DECOMPOSITION RECONSTRUCTION

(71) Applicant: Shenzhen University, Shenzhen (CN)

(72) Inventors: Qiang Li, Shenzhen (CN); Zhenhui Wang, Shenzhen (CN); Lei Huang, Shenzhen (CN); Xiaopeng Li, Shenzhen (CN); Lifang Feng, Shenzhen (CN); Xinzhu Chen, Shenzhen (CN); Yuhang Xiao, Shenzhen (CN); Sijia Lai, Shenzhen (CN)

(73) Assignee: Shenzhen University, Shenzhen (CN)

( * ) Notice: Subject to any disclaimer, the term of this patent is extended or adjusted under 35 U.S.C. 154(b) by 0 days.

(21) Appl. No.: 19/087,628

(22) Filed: Mar. 24, 2025

(65) Prior Publication Data

US 2026/0110766 A1 Apr. 23, 2026

(30) Foreign Application Priority Data

Oct. 23, 2024 (CN) .......................... 202411480341.3

(51) Int. Cl.
G01S 3/14 (2006.01)
(52) U.S. Cl.
CPC ..................................... G01S 3/14 (2013.01)
(58) Field of Classification Search
CPC ... G01S 3/00; G01S 3/02; G01S 3/023; G01S 3/043; G01S 3/06; G01S 3/12; G01S 3/143; G01S 3/18; G01S 3/22; G01S 3/24; G01S 3/28; G01S 3/802; G01S 3/8036; G01S 3/8055; G01S 3/14; G01S 13/00; G01S 17/00; G01S 3/782; G01S 3/8027; H04B 7/00; H04B 7/02; H04B 7/04; H04B 7/08; H04B 7/086; H04B 7/0871; H04B 7/0874;

(Continued)

(56) References Cited

PUBLICATIONS

X. Wu, W.-P. Zhu and J. Yan, "Direction-of-arrival estimation based on Toeplitz covariance matrix reconstruction," 2016 IEEE International Conference on Acoustics, Speech and Signal Processing (ICASSP), Shanghai, China, 2016, pp. 3071-3075. (Year: 2016).*

(Continued)

*Primary Examiner* — Andrew Schechter
*Assistant Examiner* — Matthew W. Baca
(74) *Attorney, Agent, or Firm* — Bayramoglu Law Offices LLC

(57) ABSTRACT

Provided are a direction of arrival (DOA) estimation method and system for a sparse array based on Vandermonde decomposition reconstruction, relating to the technical field of array signal processing. The method includes: constructing a covariance matrix completion optimization model based on sparse array signals and uniform linear array signals, and performing Vandermonde decomposition by using characteristics of a uniform linear array; introducing a nuclear norm to optimize a rank function in the model, and updating the covariance matrix completion optimization model; and introducing an auxiliary variable to transform the model into a solvable optimization problem, and solving the problem by an alternating direction multiplier method to obtain an optimal estimation value. The DOA is estimated using a root multiple signal classification algorithm.

6 Claims, 9 Drawing Sheets

(58) Field of Classification Search
CPC ........ H04B 7/0897; G05B 2219/45016; G06F
17/16
See application file for complete search history.

(56) References Cited

PUBLICATIONS

Song, J.; Cao, L.; Zhao, Z.; Wang, D.; Fu, C. Fast DOA Estimation Algorithms via Positive Incremental Modified Cholesky Decomposition for Augmented Coprime Array Sensors. Sensors 2023, 23, 8990. (Year: 2023).*

* cited by examiner

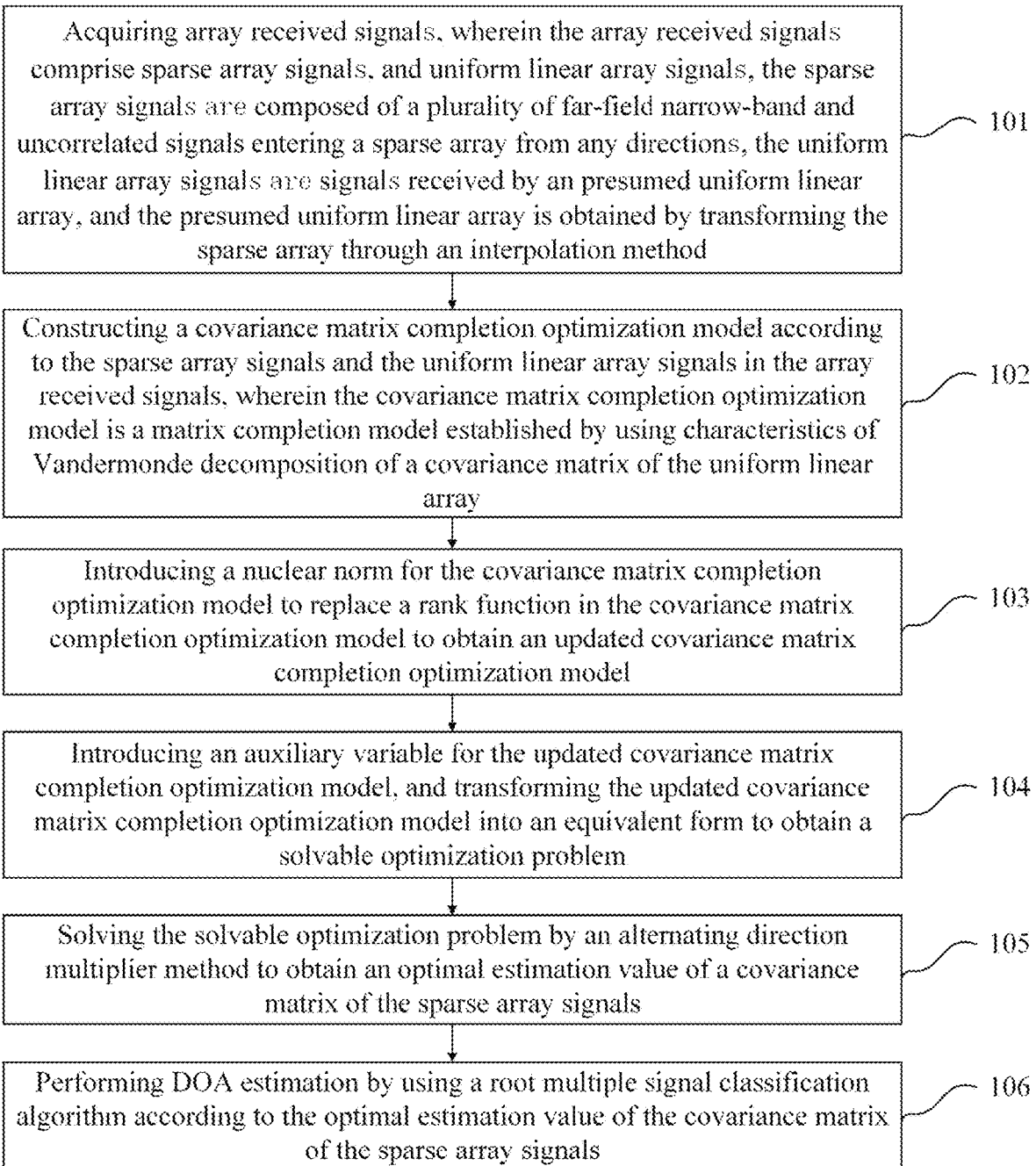

Acquiring array received signals, wherein the array received signals comprise sparse array signals, and uniform linear array signals, the sparse array signals are composed of a plurality of far-field narrow-band and uncorrelated signals entering a sparse array from any directions, the uniform linear array signals are signals received by an presumed uniform linear array, and the presumed uniform linear array is obtained by transforming the sparse array through an interpolation method ⟶ 101

Constructing a covariance matrix completion optimization model according to the sparse array signals and the uniform linear array signals in the array received signals, wherein the covariance matrix completion optimization model is a matrix completion model established by using characteristics of Vandermonde decomposition of a covariance matrix of the uniform linear array ⟶ 102

Introducing a nuclear norm for the covariance matrix completion optimization model to replace a rank function in the covariance matrix completion optimization model to obtain an updated covariance matrix completion optimization model ⟶ 103

Introducing an auxiliary variable for the updated covariance matrix completion optimization model, and transforming the updated covariance matrix completion optimization model into an equivalent form to obtain a solvable optimization problem ⟶ 104

Solving the solvable optimization problem by an alternating direction multiplier method to obtain an optimal estimation value of a covariance matrix of the sparse array signals ⟶ 105

Performing DOA estimation by using a root multiple signal classification algorithm according to the optimal estimation value of the covariance matrix of the sparse array signals ⟶ 106

DIRECTION OF ARRIVAL ESTIMATION METHOD AND SYSTEM FOR SPARSE ARRAY BASED ON VANDERMONDE DECOMPOSITION RECONSTRUCTION

CROSS REFERENCE TO THE RELATED APPLICATIONS

This application is based upon and claims priority to Chinese Patent Application No. 202411480341.3, filed on Oct. 23, 2024, the entire contents of which are incorporated herein by reference.

TECHNICAL FIELD

The present disclosure relates to the technical field of array signal processing, and in particular to a direction of arrival (DOA) estimation method and system for a sparse array based on Vandermonde decomposition reconstruction.

BACKGROUND

At present, direction of arrival (DOA) estimation using the sensor array plays a crucial role in many fields such as radar, wireless communication, acoustics, and speech. According to Nyquist sampling theorem, the uniform linear array is the most commonly used configuration in DOA estimation. In recent years, the sparse arrays, including a coprime array and a nested array, have attracted extensive attention. These arrays provide larger aperture than the uniform linear array with the same number of sensors, thus enhancing the spatial resolution. In addition, the sparse array can break through the limitation of the degree of freedom. In order to take advantage of the extra degree of freedom provided by the sparse array, the differential co-array of the sparse array is used to perform DOA estimation, which is also called a virtual array. In consideration of the whole virtual array, a sparse signal reconstruction (SSR) algorithm can achieve DOA estimation by constructing a signal sparse reconstruction problem.

However, the SSR algorithm has a problem of basis mismatch, and cannot maximize the use of the extra degree of freedom provided by the sparse array. Virtual array-based interpolation (VAI) algorithm and structured Nyquist correlation reconstruction (SNCR) algorithm may not give satisfactory estimation performance for signal sources with a small angular interval.

SUMMARY

An objective of the present disclosure is to provide a DOA estimation method and system for a sparse array based on Vandermonde decomposition reconstruction. A sparse array antenna is used for the DOA estimation of incident signals, so as to achieve better spatial resolution and maximize the use of extra degree of freedom provided by the sparse array.

To achieve the objective above, the present disclosure employs the following technical solution:

In a first aspect, the present disclosure provides a DOA estimation method for a sparse array based on Vandermonde decomposition reconstruction, including the following steps:

acquiring array received signals, where the array received signals includes sparse array signals, and uniform linear array signals, the sparse array signals are composed of signals that multiple far-field narrow-band and uncorrelated signals entering a sparse array from any directions, the uniform linear array signals are signals received by an presumed uniform linear array, and the presumed uniform linear array is obtained by transforming the sparse array through an interpolation method;

constructing a covariance matrix completion optimization model according to the sparse array signals and the uniform linear array signals in the array received signals, where the covariance matrix completion optimization model is a matrix completion model established by using characteristics of Vandermonde decomposition of a covariance matrix of the uniform linear array;

introducing a nuclear norm for the covariance matrix completion optimization model to replace a rank function in the covariance matrix completion optimization model to obtain an updated covariance matrix completion optimization model;

introducing an auxiliary variable for the updated covariance matrix completion optimization model, and transforming the updated covariance matrix completion optimization model into an equivalent form to obtain a solvable optimization problem;

solving the solvable optimization problem by an alternating direction multiplier method to obtain an optimal estimation value of a covariance matrix of the sparse array signals; and performing DOA estimation by using a root multiple signal classification algorithm according to the optimal estimation value of the covariance matrix of the sparse array signals.

In a second aspect, the present disclosure provides a DOA estimation system for a sparse array based on Vandermonde decomposition reconstruction, which includes:

a signal acquisition module, configured to acquire array received signals, where the array received signals includes sparse array signals, and uniform linear array signals, the sparse array signals are composed of a plurality of far-field narrow-band and uncorrelated signals entering a sparse array from any direction, the uniform linear array signals are signals received by an presumed uniform linear array, and the presumed uniform linear array is obtained by transforming the sparse array through an interpolation method;

a model construction module, configured to construct a covariance matrix completion optimization model according to the sparse array signals and the uniform linear array signals in the array received signals, where the covariance matrix completion optimization model is a matrix completion model established by using characteristics of Vandermonde decomposition of a covariance matrix of the uniform linear array;

a first model optimization model, configured to introduce a nuclear norm for the covariance matrix completion optimization model to replace a rank function in the covariance matrix completion optimization model, thus obtaining an updated covariance matrix completion optimization model;

a second model optimization module, configured to introduce an auxiliary variable for the updated covariance matrix completion optimization model, and transform the updated covariance matrix completion optimization model into an equivalent form to obtain a solvable optimization problem;

a computing module, configured to solve the solvable optimization problem by an alternating direction multiplier method to obtain an optimal estimation value of a covariance matrix of the sparse array signals; and a DOA estimation module, configured to perform DOA estimation by using a root multiple signal classification algorithm according to the optimal estimation value of the covariance matrix of the sparse array signals.

According to specific embodiments of the present disclosure, the present disclosure has the following technical effects:

The present disclosure provides a DOA estimation method and system for a sparse array based on Vandermonde decomposition reconstruction. The method includes the following steps: first, acquiring array received signals, where the array received signals include sparse array signals, and uniform linear array signals, the sparse array signals are composed of signals that multiple far-field narrow-band and uncorrelated signals entering a sparse array from any direction, the uniform linear array signals are signals received by an presumed uniform linear array, and the presumed uniform linear array is obtained by transforming the sparse array through an interpolation method; constructing a covariance matrix completion optimization model based on the sparse array signals and the uniform linear array signals in the array received signals, where the covariance matrix completion optimization model is a matrix completion model established by using characteristics of Vandermonde decomposition of the covariance matrix of the uniform linear array; introducing a nuclear norm for the covariance matrix completion optimization model to replace a rank function in the covariance matrix completion optimization model, thus obtaining an updated covariance matrix completion optimization model; then, introducing an auxiliary variable for the updated covariance matrix completion optimization model to perform equivalent form transformation on the updated covariance matrix completion optimization model, thus obtaining a solvable optimization problem; solving the solvable optimization problem by an alternating direction multiplier method to obtain an optimal estimation value of a covariance matrix of the sparse array signals; and at last, performing DOA estimation by using a root multiple signal classification algorithm according to the optimal estimation value of the covariance matrix of the sparse array signals. A sparse array antenna is used for the DOA estimation of incident signals, so as to achieve better spatial resolution and maximize use of extra degree of freedom provided by the sparse array.

BRIEF DESCRIPTION OF THE DRAWINGS

To describe the technical solutions of the present disclosure more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

FIG. 1 is a flowchart of a DOA estimation method for a sparse array based on Vandermonde decomposition reconstruction according to an embodiment of the present disclosure;

FIG. 5A is a schematic diagram of a spatial spectrum of an SSR algorithm; FIG. 5B is a schematic diagram of a spatial spectrum of a VAI algorithm; FIG. 5C is a schematic diagram of a spatial spectrum of an SNCR algorithm; and FIG. 5D is a schematic diagram of a spatial spectrum of an algorithm provided by the present disclosure;

FIG. 6A is a schematic diagram of a spatial spectrum of an SSR algorithm; FIG. 6B is a schematic diagram of a spatial spectrum of a VAI algorithm; FIG. 6C is a schematic diagram of a spatial spectrum of an SNCR algorithm; and FIG. 6D is a schematic diagram of a spatial spectrum of an algorithm provided by the present disclosure;

DETAILED DESCRIPTION OF THE EMBODIMENTS

Figure 2:
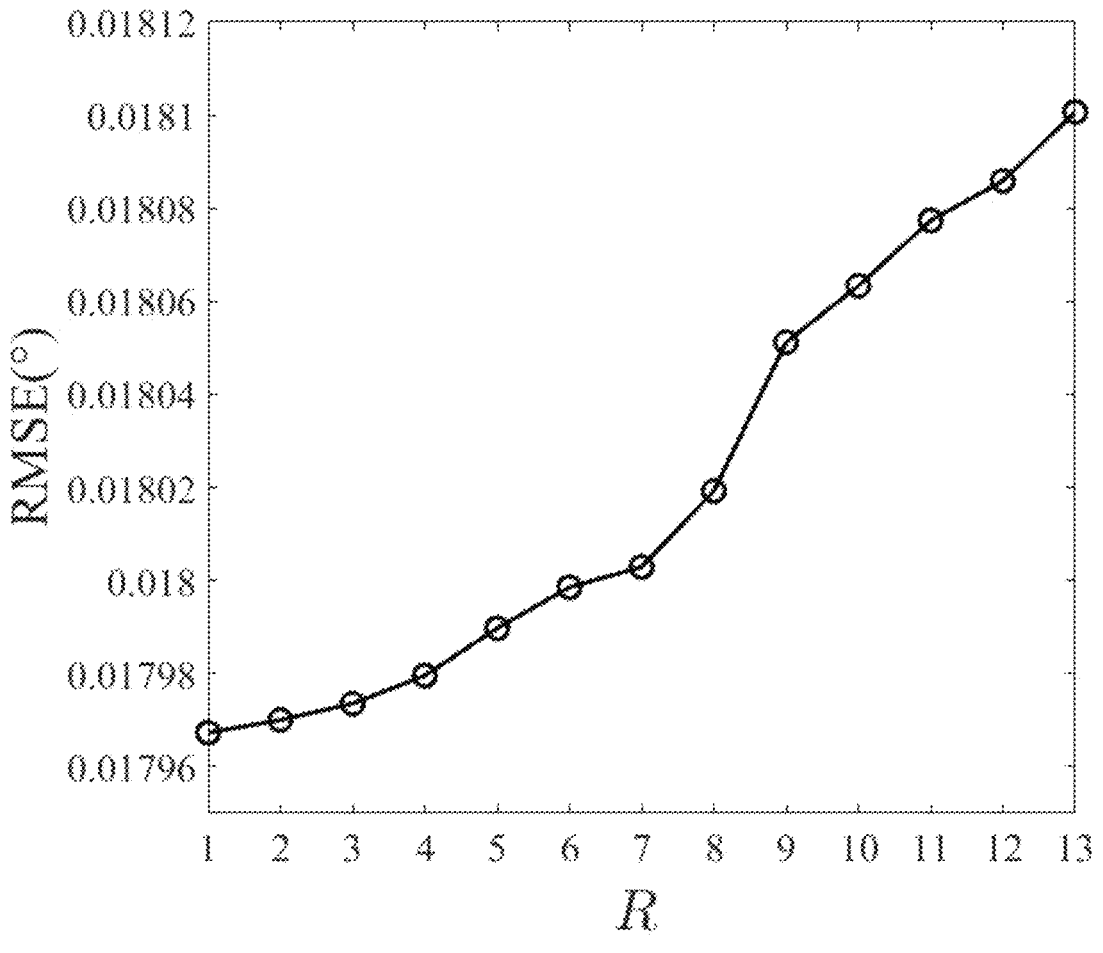
FIG. 2 is a curve of RMSE (root mean square error) according to an embodiment of the present disclosure changing with a parameter R.

The following clearly and completely describes the technical solution in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the scope of protection of the present disclosure.

In order to make the objectives, features and advantages of the present disclosure more clearly, the present disclosure is further described in detail below with reference to the embodiments.

Embodiment 1

As shown in FIG. 1, a DOA estimation method for a sparse array based on Vandermonde decomposition reconstruction, including the following steps:

Step 101: acquiring array received signals, where the array received signals include sparse array signals, and uniform linear array signals, the sparse array signals are composed of a plurality of far-field narrow-band and uncorrelated signals entering a sparse array from any directions, the uniform linear array signals are signals received by an presumed uniform linear array, and the presumed uniform linear array is obtained by transforming the sparse array through an interpolation method;

Step 102: constructing a covariance matrix completion optimization model according to the sparse array signals and the uniform linear array signals in the array received signals, where the covariance matrix completion optimization model is a matrix completion model established by using characteristics of Vandermonde decomposition of a covariance matrix of the uniform linear array;

Step 103: introducing a nuclear norm for the covariance matrix completion optimization model to replace a rank function in the covariance matrix completion optimization model to obtain an updated covariance matrix completion optimization model;

Step 104: introducing an auxiliary variable for the updated covariance matrix completion optimization model, and transforming the updated covariance matrix completion optimization model into an equivalent form to obtain a solvable optimization problem;

Step 105: solving the solvable optimization problem by an alternating direction multiplier method to obtain an optimal estimation value of a covariance matrix of the sparse array signals; and Step 106: performing DOA estimation by using a root multiple signal classification algorithm according to the optimal estimation value of the covariance matrix of the sparse array signals.

In order to deeply analyze and understand the structural characteristics of array covariance matrix, an optimization model needs to be established. Through this model, the relationship between various sensors in the array and the signal propagation characteristics can be well understood. By the optimization model, the performance of the array can be further optimized, and the accuracy and efficiency of the signal processing are improved.

In a layout design of array sensors, Nyquist sampling positions are a key concept. The positions refer to the positions of a group of sensor positions with a fixed interval, and the interval is usually determined by a half wavelength of the incident signal. Such a sampling mode can ensure the uniform sampling of the signals in the space, thus avoiding the occurrence of aliasing phenomenon. By accurately setting the Nyquist sampling positions, it can be ensured that the array can effectively capture the details of the signals, thus improving the accuracy and reliability of signal processing.

Specifically, the Nyquist sampling positions $\mathbb{U}$ represent the positions of a group of sensors with a fixed interval d, and d is the half-wavelength of the incident signal. $\mathbb{U}$ may be represented as follows:

$$\mathbb{U} = \{v_1d, v_2d, \ldots, v_{|\mathbb{U}|}d\} = \{0, d, 2d, \ldots, (|\mathbb{U}|-1)d\}. \quad (1)$$

in the formula, $\mathbb{S} = \{u_1 d, u_2 d, \ldots, u_{|\mathbb{S}|} d\}$ is a subset of $\mathbb{U}$, where $u_1=0$.

In some embodiments, the execution of Step 101 to Step 102 may specifically include the following steps:

acquiring array received signals, where the array received signals include sparse array signals, and uniform linear array signals, the sparse array signals are composed of multiple far-field narrow-band and uncorrelated signals entering a sparse array from any directions, the uniform linear array signals are signals received by an presumed uniform linear array, and the presumed uniform linear array is obtained by transforming the sparse array through an interpolation method;

computing covariance matrixes of the sparse array signals and the uniform linear array signals according to the sparse array signals and the uniform linear array signals in the array received signals;

tranforming the covariance matrix of the uniform linear array into a Vandermonde matrix and a corresponding coefficient vector by using characteristics of the Vandermonde decomposition; and constructing the covariance matrix completion optimization model according to the Vandermonde matrix and the coefficient vector.

Specifically, when acquiring the signals, it is assumed that there are L far-field narrow-band and uncorrelated signals incident on the sparse array from directions $\theta=[\theta_1, \theta_2, \ldots, \theta_L]$, and the sparse array signals in the array received signals can be modeled as follows:

$$x_{\mathbb{S}}(t) = \sum_{l=1}^{L} a_{\mathbb{S}}(\theta_l)s_l(t) + n_{\mathbb{S}}(t) = A_{\mathbb{S}}(\theta)s(t) + n_{\mathbb{S}}(t) \quad (2)$$

where $\Sigma$ represents a summation symbol, $s(t)=[s_1(t), s_2(t), \ldots, s_L(t)]^T$ represents an L-dimensional signal vector, $l\in(1, L)$; t represents sampling time; $(\cdot)^T$ represents a transpose operation; $n_{\mathbb{S}}(t)$ represents a $|\mathbb{S}|$-dimensional independent and identically distributed complex-valued additive Gaussian noise vector, which has a mean of zero and a covariance matrix of $$\sigma_n^2 I; \sigma_n^2 I$$

is noise power, $A_{\mathbb{S}}(\theta)=[a_{\mathbb{S}}(\theta_1), a_{\mathbb{S}}(\theta_2), \ldots, a_{\mathbb{S}}(\theta_L)]$ represents a $|\mathbb{S}|\times L$-dimensional array manifold matrix; and $a_{\mathbb{S}}(\theta_l)$ is a $|\mathbb{S}|$-dimensional steering vector with an angle of $\theta_l$, which is represented as follows:

$$a_{\mathbb{S}}(\theta_l) = \left[1, e^{-j\frac{2\pi}{\lambda}u_2 d\sin\theta_l}, \ldots, e^{-j\frac{2\pi}{\lambda}u_{|\mathbb{S}|}d\sin\theta_l}\right]^T \quad (3)$$

where $\lambda$ represents a wavelength of the incident signals, j is an imaginary unit, and e is the base of a natural logarithm.

According to the acquired sparse array S, the covariance matrix is represented as follows:

$$R_{\mathbb{S}} = \mathbb{E}\{x_{\mathbb{S}}(t)x_{\mathbb{S}}^H(t)\} = A_{\mathbb{S}}(\theta)PA_{\mathbb{S}}^H(\theta) + \sigma_n^2 I \quad (4)$$

where $\mathbb{E}\{\cdot\}$ represents mathematical expectation, $$P = \text{diag}([\sigma_1^2, \sigma_2^2, \ldots, \sigma_L^2])$$

represents a signal covariance matrix, diag(•) represents a diagonal matrix generated by taking elements of one vector as diagonal elements;

$$\sigma_l^2$$

represents power of an $l^{th}$ signal, $$\sigma_n^2 I$$

is a noise term, and n represents conjugate transpose.

However, in practice, the covariance matrix $R\mathbb{S}$ of the sparse array can only be estimated through the sample covariance matrix, which is expressed as follows:

$$\hat{R}_{\mathbb{S}} = \frac{1}{K}\sum_{t=1}^{K} x_{\mathbb{S}}(t)x_{\mathbb{S}}^{H}(t) \qquad (5)$$

where K represents the number of time domain samples (snapshot number).

In order to meet the Nyquist spatial sampling criterion (that is, the sampling frequency must be at least twice the highest frequency component of the signal) while remaining the aperture of the sparse array unchanged, the Nyquist space filling process needs to be implemented to generate an presumed uniform linear array. In this process, by interpolating the sparse array $\mathbb{S}$ into a continuous uniform linear array $\mathbb{U}$, the problem of lacking actual sampling data at the position $\mathbb{U}$ - $\mathbb{S}$ is solved, where $\mathbb{U}$ includes all elements of $\mathbb{S}$. In theory, the received signal of the presumed uniform linear array U may be modeled as follows:

$$x_{\mathbb{U}}(t) = \sum_{l=1}^{L} a_{\mathbb{U}}(\theta_l)s_l(t) + n_{\mathbb{U}}(t) = A_{\mathbb{U}}(\theta)s(t) + n_{\mathbb{U}}(t) \qquad (6)$$

where $n_{\mathbb{U}}(t)$ is a $|\mathbb{S}|$-dimensional noise vector; $A_{\mathbb{U}}(\theta)=[a_{\mathbb{U}}(\theta_1), a_{\mathbb{U}}(\theta_2), \ldots, a_{\mathbb{U}}(\theta_L)]$ represents a $|\mathbb{S}| \times L$-dimensional array manifold matrix; and $a_{\mathbb{U}}(\theta_1)$ represents a $|a_{\mathbb{U}}|$-dimensional steering vector with an angle of $(\theta_l)$, which is represented as follows:

$$a_{\mathbb{U}}(\theta_l) = \left[1, e^{-j\frac{2\pi}{\lambda}v_2 d\sin\theta_l}, \ldots, e^{-j\frac{2\pi}{\lambda}v_{|\mathbb{U}|} d\sin\theta_l}\right]^T \qquad (7)$$

where a received signal $x_{\mathbb{S}}$ of the sparse array $\mathbb{S}$ may be represented as follows through $x_{\mathbb{U}}$:

$$x_{\mathbb{S}}(t) = \Phi x_{\mathbb{U}}(t) \qquad (8)$$

where $\Phi$ is a $|\mathbb{S}| \times |\mathbb{U}|$-dimensional compression matrix including only 0 and 1, and when the $i^{-th}$ element of $\mathbb{S}$ overlaps with the $j^{-th}$ element of $\mathbb{U}$, $\Phi_{i,j}=1$, which represents that an element of the $i^{-th}$ row and $j^{-th}$ column of $\Phi$ is 1, and other all elements are zero. For example, for a sparse array $\mathbb{S}_{example}=\{0, d, 3d, 6d\}$, and a uniform linear array $\mathbb{U}_{example}=\{0, d, 2d, 3d, 4d, 5d, 6d\}$, the following can be obtained:

$$\Phi_{example} = \begin{bmatrix} 1 & 0 & 0 & 0 & 0 & 0 & 0 \\ 0 & 1 & 0 & 0 & 0 & 0 & 0 \\ 0 & 0 & 0 & 1 & 0 & 0 & 0 \\ 0 & 0 & 0 & 0 & 0 & 0 & 1 \end{bmatrix} \qquad (9)$$

The covariance matrix of the presumed uniform linear array U is represented as follows:

$$R_{\mathbb{U}} = \mathbb{E}\{x_{\mathbb{U}}(t)x_{\mathbb{U}}^{H}(t)\} = A_{\mathbb{U}}(\theta)PA_{\mathbb{U}}^{H}(\theta) + \sigma_n^2 I = R_{\mathbb{U}s} + \sigma_n^2 I \qquad (10)$$

where $R_{\mathbb{U}s}$ represents a noise-free covariance matrix of $\mathbb{U}$.

$|\mathbb{S}| \times |\mathbb{S}|$-dimensional sparse array covariance matrix $R_{\mathbb{S}}$ may be augmented to the $|\mathbb{U}| \times |\mathbb{U}|$-dimensional pre sumed uniform linear array covariance matrix $R_{\mathbb{U}}$ as follows:

$$\overline{R_{\mathbb{U}}} = \Lambda R_{\mathbb{U}} \Lambda = \Phi^H R_{\mathbb{S}} \Phi \qquad (11)$$

where $\Lambda=\Phi^H\Phi$ is a $|\mathbb{U}| \times |\mathbb{U}|$-dimensional diagonal matrix. It may be noted that for all id belonging to $\mathbb{U} - \mathbb{S}$, the $(i+1)^{-th}$ row and the $(i+1)^{-th}$ column of the augmented covariance matrix $\overline{R_{\mathbb{U}}}$ are zero vectors. Therefore, the problem of filling the assumed sensors at the Nyquist sampling positions can be transformed into a problem of completing the covariance matrix $\overline{R_{\mathbb{U}}}$, thus reconstructing the covariance matrix $R_{\mathbb{U}}$.

Hankel matrix transformation operator $\mathcal{R}$ represents that an n×1-dimensional vector x is mapped into an (n−m+1)×m-dimensional Hankel matrix $\mathcal{R}$[x], that is, $\mathcal{R}[x]_{i,j}=x_{i+j-1}$, which represents that the $(i+j-1)^{-th}$ element of x is equal to an element at the $i^{-th}$ row and the $j^{-th}$ column of $\mathcal{R}$[x]. An adjoint operator $\mathcal{R}*$ of $\mathcal{R}$ represents a (n−m+1)×m-dimensional matrix X is mapped into an n-dimensional vector $\mathcal{R}*[X]$, that is $[\mathcal{R}*X]_k=\Sigma_{i+j-1=k}X_{i,j}$, which represents that the $k^{-th}$ element of $\mathcal{R}*[X]$ is equal to a sum of elements in X, a sum of whose row subscript and column subscript is equal to k+1. The column-extraction operator $Q_r$ represents that a $r^{th}$ column of the matrix is extracted, that is $Q_r[X]=[X_{\cdot r}]$, $X_{\cdot}r$ represents the $r^{th}$ column of the matrix X. An adjoint operator $Q_r^*$ of $Q_r$ represents that an n-dimensional vector x is mapped into an n×m-dimensional matrix, which is defined as follows:

$$[Q_r^* x]_{:,k} = \begin{cases} x, & k = r \\ 0, & k \neq r \end{cases}, \forall r \in \{1, \ldots, m\} \qquad (12)$$

where $\forall r \in \{1, \ldots, m\}$ represents that a value of r is respectively $1, \ldots, m$.

$$z_l = e^{-j\frac{2\pi}{\lambda} d\sin\theta_l},$$

where $l=1, \ldots, L$. In theory, the noise-free array covariance matrix $R_{\mathbb{U}s}$ can be decomposed as follows:

$$R_{\mathbb{U}s} = \begin{bmatrix} 1 & \cdots & 1 \\ z_1 & \cdots & z_L \\ \vdots & \vdots & \vdots \\ z_1^{|\mathbb{U}|-1} & \cdots & z_L^{|\mathbb{U}|-1} \end{bmatrix} \begin{bmatrix} \sigma_1^2 & & \\ & \ddots & \\ & & \sigma_L^2 \end{bmatrix} \begin{bmatrix} 1 & \cdots & 1 \\ z_1 & \cdots & z_L \\ \vdots & \vdots & \vdots \\ z_1^{|\mathbb{U}|-1} & \cdots & z_L^{|\mathbb{U}|-1} \end{bmatrix}^H = \qquad (13)$$

$$A_{\mathbb{U}}\{diag([\sigma_1, \ldots, \sigma_L])\}^2 A_{\mathbb{U}}^H = UU^{H}$$

where $U=A_{\mathbb{U}} diag([\sigma_1, \ldots, \sigma_L])$ is a $|\mathbb{U}| \times L$-dimensional matrix. The decomposition is called Vandermonde decomposition of a positive semi-definite Toeplitz matrix. As $A_{\mathbb{U}}$ is a Vandermonde matrix, a $l^{-th}$ column of U correspond to a product of the $l^{-th}$ column of $A_{\mathbb{U}}$ and one coefficient $$\sigma_l^2.$$

Therefore, in this embodiment, U is called to have a Vandermonde structure.

Based on the above matrix decomposition, the noise term $$\sigma_n^2 I$$

is eliminated, the matrix $R_{U_S}$ is reconstructed, which involves finding a $|U|\times L$-dimensional matrix with a Vandermonde structure, thus making $R_{U_S}=UU^H$. However, it is difficult to achieve the direct constraint of adding the Vandermonde structure. x is enabled to represent an N×R-dimensional matrix without zero column, and apparently, there is $$\sum_{r=1}^{R}\text{rank}\,(\mathcal{R}[\mathcal{Q}_r[X]]) \geq R,$$

where rank(•) represents the rank of the matrix. If and only if X has the Vandermonde structure, $$\sum_{r=1}^{R}\text{rank}\,(\mathcal{R}[\mathcal{Q}_r[X]]) = R.$$

Therefore, minimizing $$\sum_{r=1}^{R}\text{rank}\,(\mathcal{R}[\mathcal{Q}_r[U]])$$

can encourage to have the Vandermonde structure. In addition, $R_{U_S}$ is a Hermitian-Toeplitz matrix, and available information in the augmented covariance is used as reference information in the reconstruction process. Therefore, the covariance matrix of the presumed uniform linear array can be reconstructed by solving the following optimization problem:

$$\min_{U,u,}\sum_{r=1}^{R}\text{rank}\,(\mathcal{R}[\mathcal{Q}_r[U]]) + \lambda\left\|\Phi\mathcal{T}(u)\Phi^H - \hat{R}_\mathbb{S}\right\|_F^2 \qquad (14)$$

$$\text{subject to } UU^H = T(u)$$

$U=A_U\,\text{diag}([\sigma_1,\ldots,\sigma_L])$ is a $|U|\times L$-dimensional matrix, subject to is used to limit a feasible region for limiting an optimization variable, $\mathcal{T}(u)$ is a covariance matrix, which is a Hermitian-Toeplitz matrix, and a first column of the covariance matrix is u, $\|\bullet\|_F$ represents Frobenius norm; a covariance fitting error is used to tolerate the noise term, and a regularization parameter $\lambda$ is used to weigh the covariance fitting error and a rank function; the $\mathcal{R}$ is a Hankel matrix transformation operator, $\lambda$ represents a wavelength of an incident signal, R indicates a total number of columns, $\mathcal{Q}_r$ is a column-extraction operator, $\Phi$ represents a $|\mathbb{S}|\times|U|$-dimensional compression matrix only including 0 and 1, and $\hat{R}_\mathbb{S}$ is as shown in a formula (5).

The execution of Step 103 to Step 104 may specifically performed as follows:

As the rank function makes the minimum problem difficult to be solved, a nuclear norm is introduced as a convex relaxation of the rank. The optimization problem (14) may be reformulated as follows:

$$\min_{U,u,}\sum_{r=1}^{R}\|\mathcal{R}[\mathcal{Q}_r[U]]\|_* + \lambda\left\|\Phi\mathcal{T}(u)\Phi^H - \hat{R}_\mathbb{S}\right\|_F^2 \qquad (15)$$

$$\text{subject to } UU^H = T(u)$$

where $\|\bullet\|_*$ represents the nuclear norm.

In practice, the number L of the signal sources is generally unknown. Therefore, the algorithm in this embodiment needs to preset a parameter R to determine the size of the matrix U. In order to solve the optimization problem conveniently, an auxiliary variable is introduced and (15) is rewritten as the following equivalent form:

$$\min_{U,V,u,B_r}\sum_{r=1}^{R}\|B_r\|_* + \lambda\left\|\Phi\mathcal{T}(u)\Phi^H - \hat{R}_\mathbb{S}\right\|_F^2 \qquad (16)$$

$$\text{subject to } UV^H = \mathcal{T}(u),\ U = V, \mathcal{R}[\mathcal{Q}_r[U]] = B_r,\ \forall\, r \in \{1,\ldots,R\}.$$

In some embodiments, Step 105 may specifically performed as follows:

An alternating direction multiplier method is used to solve the optimization problem, where an augmented Lagrangian function of an optimization problem (16) is as follows:

$$\mathcal{L}_\mu(U,V,u,B_r,C,D,E_r) = \sum_{r=1}^{R}\|B_r\|_* + \lambda\left\|\Phi\mathcal{T}(u)\Phi^H - \hat{R}_\mathbb{S}\right\|_F^2 + \qquad (17)$$

$$\left\langle C,\,UV^H - \mathcal{T}(u)\right\rangle + \frac{\mu}{2}\left\|UV^H - \mathcal{T}(u)\right\|_F^2 + \langle D,\,U-V\rangle +$$

$$\frac{\mu}{2}\|U-V\|_F^2 + \sum_{r=1}^{R}\langle E_r,\,\mathcal{R}\mathcal{Q}_r U - B_r\rangle + \frac{\mu}{2}\|R[\mathcal{Q}_r[U]] - B_r\|_F^2$$

in formula (17), $\mathcal{L}_\mu$ represents a Lagrangian function, C, D and $E_r$ are Lagrangian multipliers, in $\langle X, Y\rangle = \text{tr}(X^H Y)$, tr(•) denote traces of the matrix; and $\mu$ is a penalty parameter.

Next, the variable V is initialized in this embodiment according to the following ways.

First, $\hat{R}_\mathbb{S}$ is subjected to feature value decomposition, that is $\hat{R}_\mathbb{S}=Q\Sigma Q^{-1}$. Then, the variable is initialized as $V^0=Q_{:,1:R}$, and $Q_{:,1:R}$ represents taking the first column to the R-th column of Q.

The alternating direction multiplier method employs the following iterative solution to solve the optimization problem (16):

$$\min_U \mathcal{L}_\mu\big(U,V^k,u^k,B_r^k,C^k,D^k,E_r^k\big) \qquad (18)$$

$$\min_V \mathcal{L}_\mu\big(U^{k+1},V,u^k,B_r^k,C^k,D^k,E_r^k\big) \qquad (19)$$

$$\min_U \mathcal{L}_\mu\big(U^{k+1},V^{k+1},u,B_r^k,C^k,D^k,E_r^k\big) \qquad (20)$$

$$\min_{B_r} \mathcal{L}_\mu\big(U^{k+1},V^{k+1},u^{k+1},B_r,C^k,D^k,E_r^k\big) \qquad (21)$$

$$C^{k+1} = C^k + \mu^k\big[U^{k+1}\big(V^{k+1}\big)^H - \mathcal{T}\big(u^{k+1}\big)\big] \qquad (22)$$

$$D^{k+1} = D^k + \mu^k\big(U^{k+1} - V^{k+1}\big) \qquad (23)$$

$$E_r^{k+1} = E_r^k + \mu^k\big(\mathcal{R}\big[\mathcal{Q}_r\big[U^{k+1}\big]\big] - B_r^{k+1}\big),\ \forall\, r \in \{1,\ldots,R\}. \qquad (24)$$

(1) U is updated, which is specifically as follows:

In order to update U, a subproblem (18) needs to be solved, a form of which may be represented as follows:

$$\min_{U} \left\| U(V^k)^H - \mathcal{T}(u^k) + \frac{1}{\mu^k}C^k \right\|_F^2 + \tag{25}$$

$$\sum_{r=1}^{R} \left\| R[Q_r[U]] - B_r^k + \frac{1}{\mu^k}E_r^k \right\|_F^2 + \left\| U - V^k + \frac{1}{\mu^k}D^k \right\|_F^2.$$

As a target function of the optimization problem (25) is a convex function, the conjugate matrix U* of U is defined, a partial derivative of the target function about U* is 0, thus obtaining the following linear equation to solve the problem:

$$U(V^k)^H V^k + \sum_{r=1}^{R} Q_r^*[R^*[R[Q_r[U]]]] + U = \tag{26}$$

$$\mathcal{T}(u^k)V^k - \frac{1}{\mu^k}C^k V^k + V^k - \frac{1}{\mu^k}D^k + \sum_{r=1}^{R} Q_r^*\left[R^*\left[B_r^k - \frac{1}{\mu^k}E_r^k\right]\right]$$

According to the definition of the operators $\mathcal{R}$ and $\mathcal{R}^*$, it can be obtained that:

$$\mathcal{R}*[\mathcal{R}[x]] = \omega \odot x. \tag{27}$$

In formula (27), ω is a vector, a $k^{-th}$ element of which is the number of elements on a $k^{-th}$ back-diagonal of the Hankel matrix $\mathcal{R}[x]$, and ⊙ represents Hadamard product. According to the definition of the operators $Q_r$ and $Q_r^*$ the following formula can be obtained:

$$\sum_{r}^{L} Q_r^*[\mathcal{R}^*[\mathcal{R}[Q_r[U]]]] = T \odot U; \tag{28}$$

where T is a matrix, each column of which is ω. Therefore, the formula (26) may be represented as follows:

$$U_{i,:}(V^k)^H V^k + U_{i,:}\text{diag}(T_{i,:}) + U = Y_{i,:}; \tag{29}$$

where Y is a right part of the expression (29). Therefore, a closed-form solution of each row of U can be obtained as follows:

$$U_{i,:}^{k+1} = Y_{i,:}[(V^k)^H V^k + \text{diag}(T_{i,:}) + I]^{-1}. \tag{30}$$

Where I represents an R×R-dimensional identity matrix, and $(\bullet)^{-1}$ represents an inverse operation of the matrix.

(2) V is updated, which may be specifically as follows:

In order to update V, a subproblem (19) can be represented as follows:

$$\min_{V} \left\| U^{k+1} V^H - \mathcal{T}(u^k) + \frac{1}{\mu^k}C^k \right\|_F^2 + \left\| U^{k+1} - V + \frac{1}{\mu^k}D^k \right\|_F^2. \tag{31}$$

Similar to the update of U, a closed-form solution of V is represented as follows:

$$V^{k+1} = \tag{32}$$

$$\left\{ \left[ (\mathcal{T}(u^k))^H + I - \frac{1}{\mu^k}(C^k)^H \right] U^{k+1} + \frac{1}{\mu^k}D^k \right\} [(U^{k+1})^H U^{k+1} + I]^{-1}.$$

(3) u is updated, which is specifically as follows:

In order to update u, a subproblem (20) can be represented as follows:

$$\min_{u} \lambda \left\| \Phi \mathcal{T}(u) \Phi^H - \hat{R}_\mathbb{S} \right\|_F^2 + \frac{\mu^k}{2} \left\| \mathcal{T}(u) - U^{k+1}(V^{k+1})^H - \frac{1}{\mu}C^k \right\|_F^2. \tag{33}$$

As a target function of the optimization problem (33) is a convex function, its partial derivative about u* is 0, thus obtaining a solution of the subproblem as follows:

$$u = \left( \lambda \text{diag}(d) + \frac{\mu^k}{2}D \right)^{-1} \left( \lambda r + \frac{\mu^k}{2}z \right). \tag{34}$$

Specifically, variables involved in the formula (34) are defined as follows:

$$d_i = \sum_{j=1}^{|U|-i+1} \left[ (\Phi^H J \Phi)_{j,j+i-1} + (\Phi^H J \Phi)_{j+i-1,j}^* \right] \tag{35}$$

$$z_i = \sum_{j=1}^{|U|-i+1} \left( Z_{j,j+i-1} + Z_{j+i-1,j}^* \right)$$

$$r_i = \sum_{j=1}^{|U|-i+1} \left[ (\Phi^H \hat{R}_\mathbb{S} \Phi)_{j,j+i-1} + (\Phi^H \hat{R}_\mathbb{S} \Phi)_{j+i-1,j}^* \right]$$

$$i \in \{1, 2, \dots, |U|\}$$

$$D = \text{diag}([|U|, 2(|U|-1), 2(|U|-2), \dots, 2]), \tag{36}$$

in the formula, d, z and r are $|U|$-dimensional vectors, $d_i$, $z_i$ and $r_i$ represent the i-th elements of d, z and r $$Z = U^{k+1}(V^{k+1})^H + \frac{1}{\mu}C^k,$$

J represents a $|\mathbb{S}| \times |\mathbb{S}|$-dimensional matrix with all elements of 1.

(4) $B_r$ is updated, which may be specifically as follows:

Finally, in order to update $B_r$, a solution of $B_r$ can be obtained by solving the following problems:

$$\min_{B_r} \|B_r\|_* + \frac{\mu^k}{2} \left\| R[Q_r[U^{k+1}]] + \frac{1}{\mu^k}E_r^k - B_r \right\|_F^2. \tag{37}$$

A solution of the problem (37) is represented as follows through a soft threshold operator;

$$B_r^{k+1} = \mathcal{D}_{\frac{1}{\mu^k}} \left( \mathcal{R}[\mathcal{Q}_r[U^{k+1}]] + \frac{1}{\mu^k} E_r^k \right). \tag{38}$$

In such an iterative algorithm, in order to accelerate convergence, a strategy of $\mu^{k+1} = \rho \mu^k$ is adopted in this embodiment to gradually increase the parameter $\mu$, and a reconstructed covariance matrix $\mathcal{T}(u)$ is obtained after completing iteration.

In some embodiments, Step 106 may be performed as follows:

DOA estimation is carried out by using a multiple signal classification algorithm.

Specifically, the DOA estimation is carried out using a root multiple signal classification algorithm (Root-MUSIC) according to the reconstructed covariance matrix $\mathcal{T}(u)$. A spatial spectrum of multiple signal classification (MUSIC) is as follows:

$$P_{Music}(\theta) = \frac{1}{a^H(\theta) U_N U_N^H a(\theta)}; \tag{39}$$

In the formula, $U_N$ represents a noise sub-space of $\mathcal{T}(u)$; $a(\theta)$ represents a steering vector. By searching the maximum $\hat{L}$ peak values in $P_{MUSIC}$, a DOA estimation result can be obtained. The number $\hat{L}$ of the signal sources may be estimated using Akaike Information Criterion (AIC), the minimum description length (MDL), or a Gerschgorin disk estimation (GDE) method.

In conclusion, the whole technical solution of the present disclosure is as follows:

An input is sparse array received signals $$\{x_s(t)\}_{t=1}^k;$$

an output is a DOA estimation result $\hat{\theta}_l$, $l=1, 2, \ldots, L$; and the variables are initialized as U, V, u, C, D, $E_r$, $\forall_r \in \{1, \ldots, R\}$, $\lambda$, $\mu^0$, $\rho$, k=0.

When k<100, the following operations are performed: updating U according to the formula (30); updating V according to the formula (32); updating u according to the formula (34); for r=1, ..., R, updating $B_r$ according to the formula (38); for r=1, ..., R, updating $E_r$ according to the formula (24); updating C, D and k=k+1 according to the formula (22) and the formula (23); and then executing the root-MUSIC algorithm on $\mathcal{T}(u)$ for DOA estimation.

Specifically, an embodiment is provided to illustrate the method involved in the present disclosure as follows:

Considering a coprime array composed of seven physical sensors, the positions of the sensors are $\mathbb{S}_{coprime} = \{0, 3d, 5d, 6d, 9d, 10d, 12d\}$. In the following simulation test, for the algorithm provided by the present disclosure, the parameters are set as follows: $\mu^0 = 1 \times 10^{-3}$ and $\mu = 1.8$, which are heuristically selected based on practical experience. As the number of the signal sources is unknown, the parameter R is also set as the maximum value R 13. The snapshot number is set as K=500.

The estimation accuracy of a test algorithm is evaluated by root mean square error (RMSE), which is defined as follows:

$$RMSE = \sqrt{\frac{1}{NL} \sum_{n=1}^N \sum_{l=1}^L (\hat{\theta}_{n,l} - \theta_l)^2}; \tag{40}$$

where N represents the number of Monte Carlo tests, L represents the number of the incident signals, $\hat{\theta}_{n,l}$ represents an $l^{-th}$ estimation angle of the $n^{-th}$ test, and $\theta_l$ represents a true angle of the $l^{-th}$ incident signal.

Figure 3:
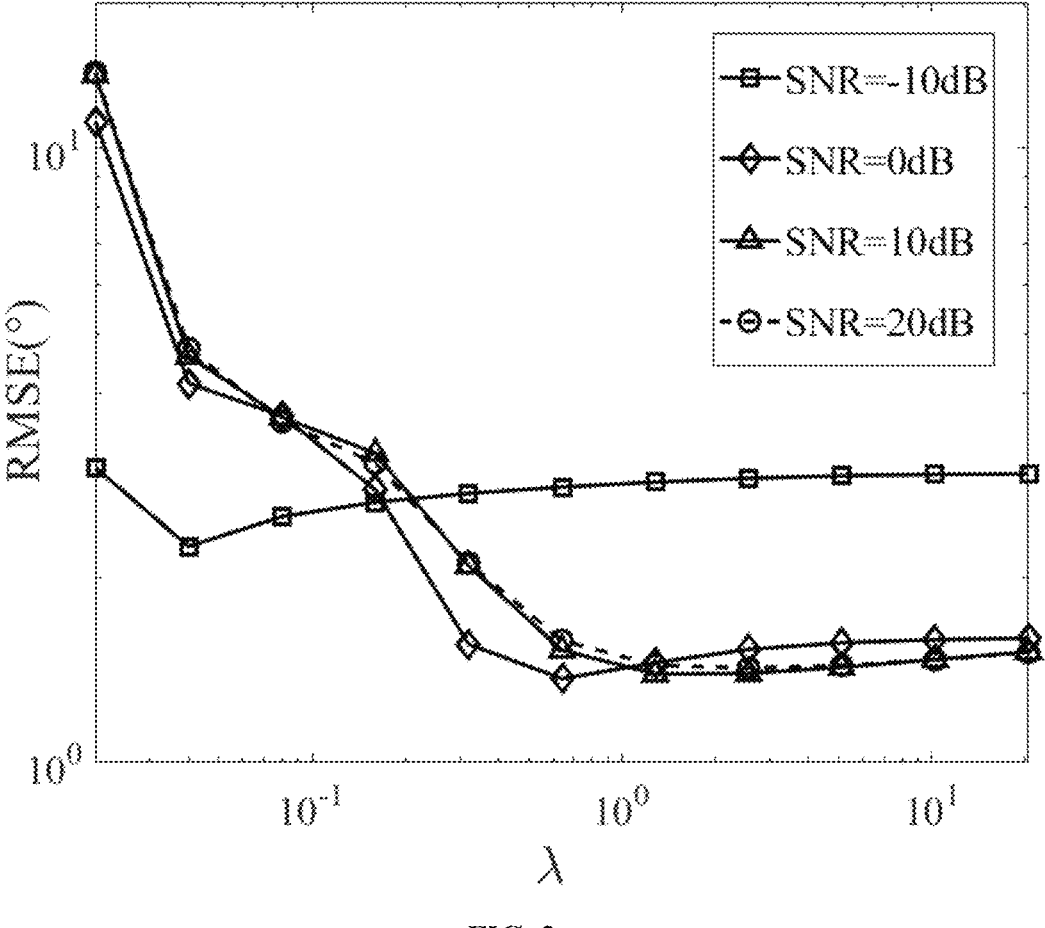
FIG. 3 is a curve of RMSE according to an embodiment of the present disclosure changing with a parameter $\lambda$.

The influence of the parameter $\lambda$ and the parameter R on the estimation accuracy of the technical method of the present disclosure are tested at first. It is set that the incident signal has an incident angle of $0°$ and a signal noise ratio (SNR) of 10 dB, and 5000 Monte Carlo tests are carried out. A curve of the RMSE changing with the parameter R is shown in FIG. 2. It can be observed that even if R is set to be greater than the number of the actual signal sources, the estimation accuracy of the technical method provided by the present disclosure is just slightly decreased. Then, 500 Monte Carlo tests are carried out respectively with respect to the signal noise ratios being set as −10 dB, 0 dB, 10 dB, and 20 dB. Curves of RMSE changing with the parameter $\lambda$ under different signal noise ratios are shown in FIG. 3. Apparently, for different SNRs, there is an optimal parameter $\lambda$ which makes the RMSE minimum. In addition, the higher the SNR, the greater the parameter $\lambda$ set for the RMSE to obtain the minimum value.

Figure 4:
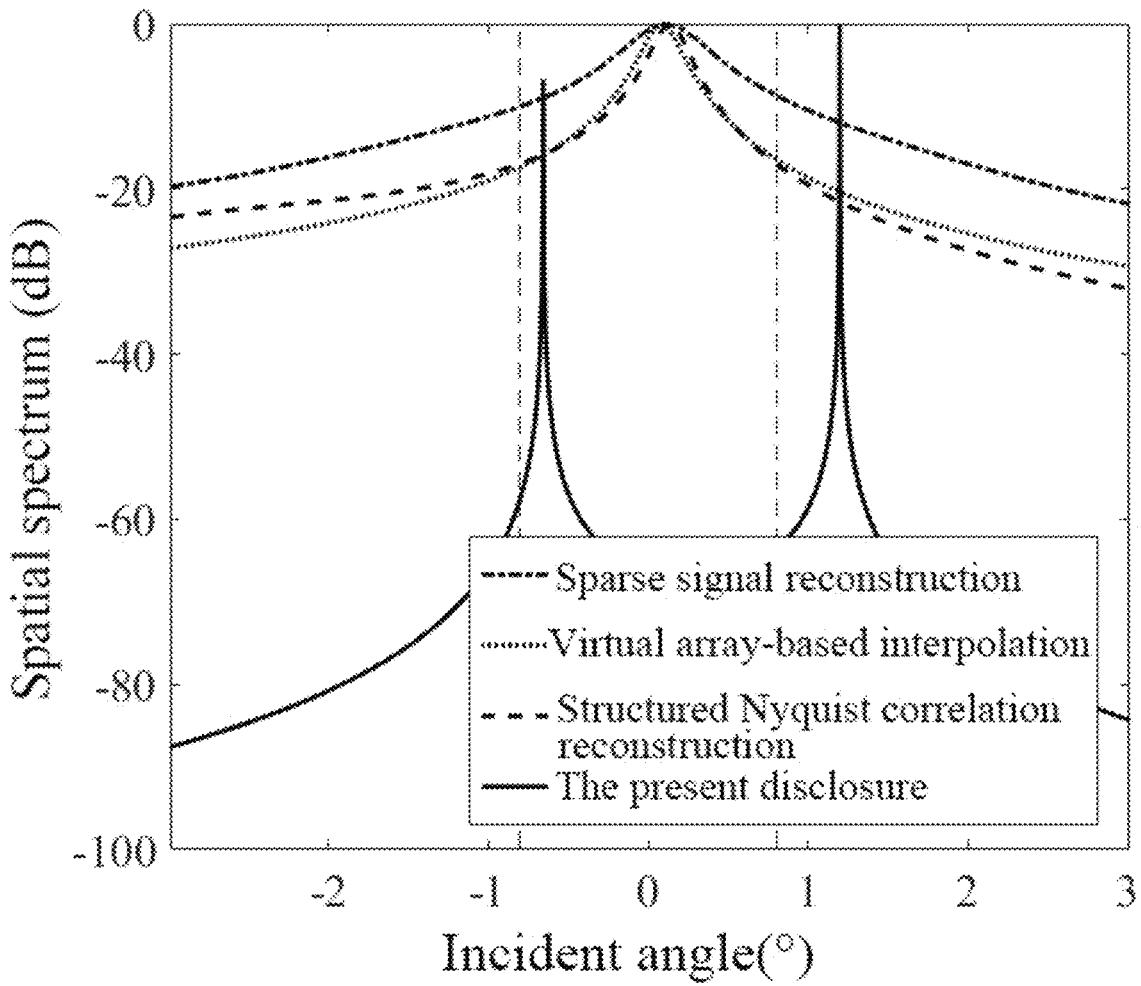
FIG. 4 is a schematic diagram of a spatial spectrum of a test algorithm when an incident angle is −0.8° and 0.8° according to an embodiment of the present disclosure.
Figure 5A:
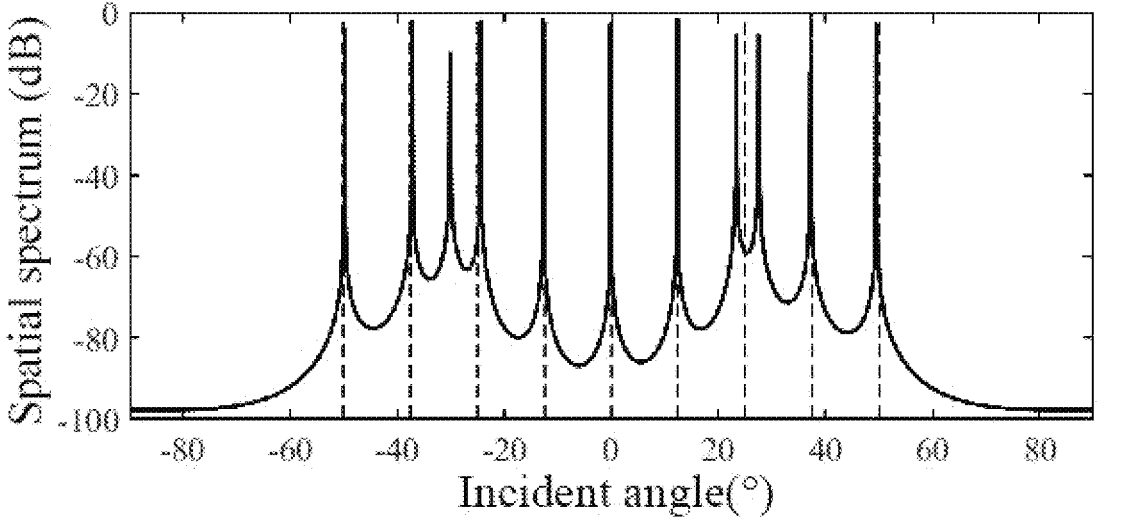
FIG. 5A to FIG. 5D are schematic diagrams of spatial spectra of a test algorithm when the number of signal sources according to an embodiment of the present disclosure is 9, where
Figure 5B:
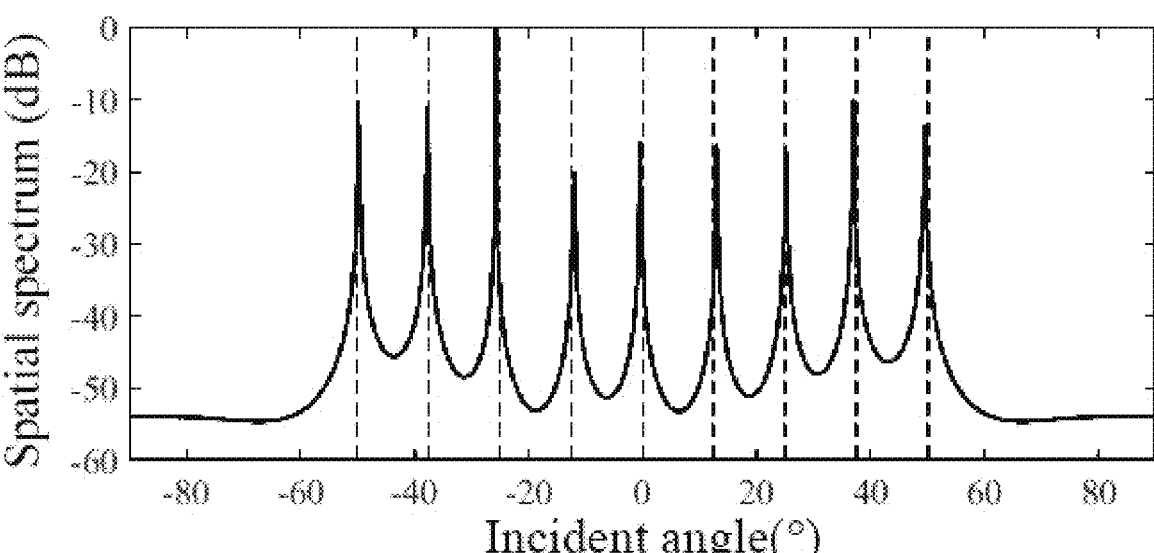
Figure 5C:
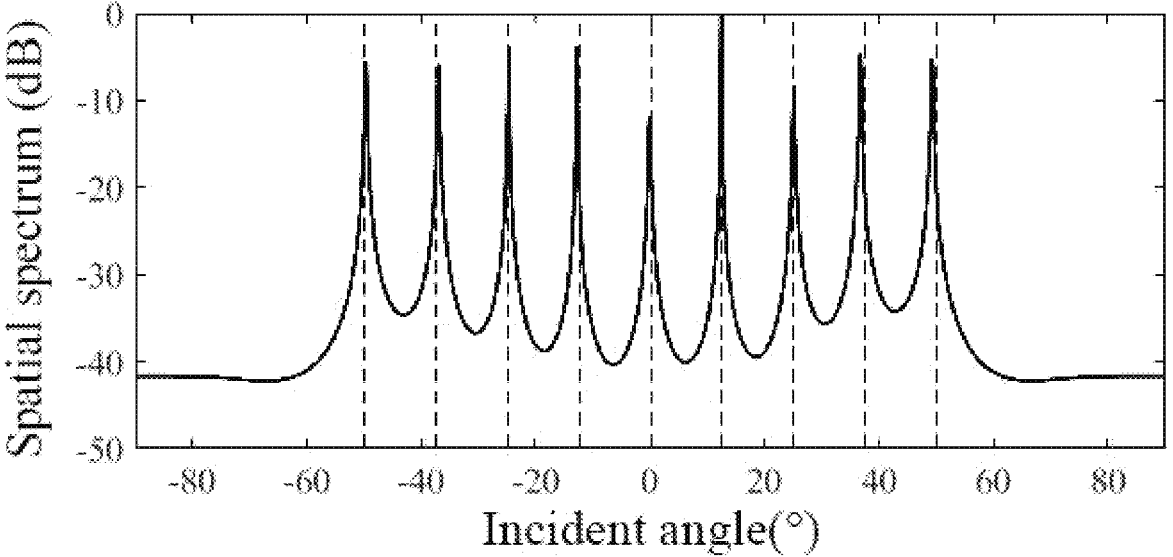
Figure 5D:
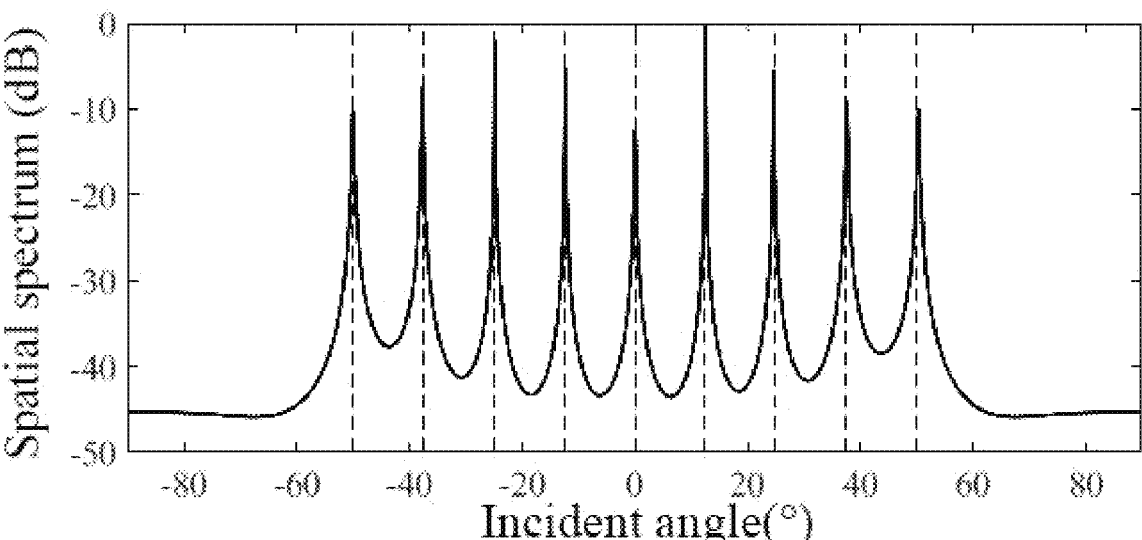
Figure 6A:
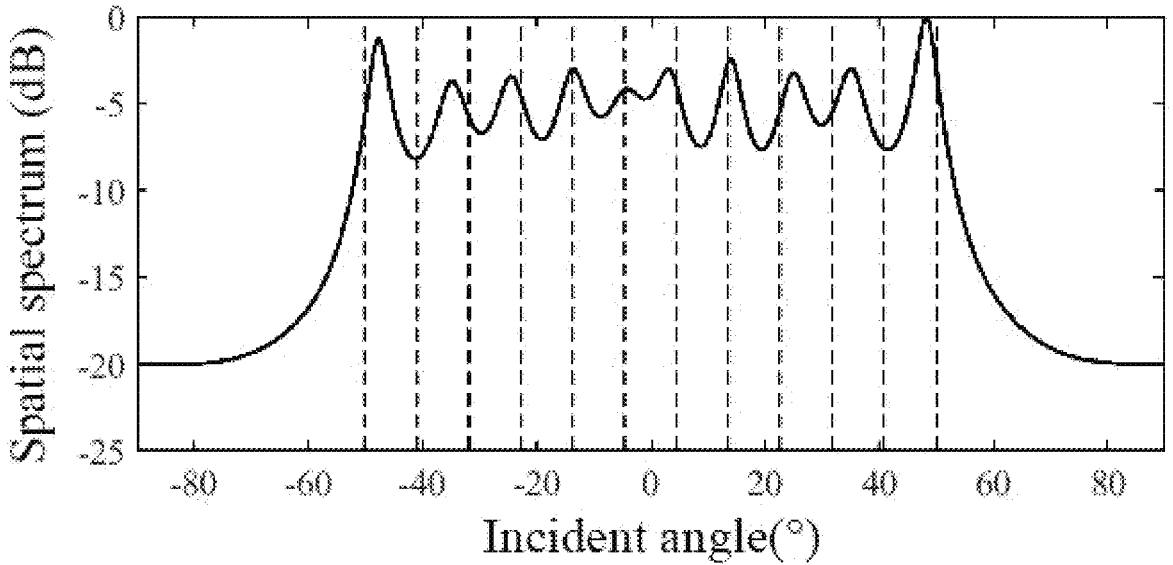
FIG. 6A to FIG. 6D are schematic diagrams of spatial spectra of a test algorithm when the number of signal sources according to an embodiment of the present disclosure is 12.
Figure 6B:
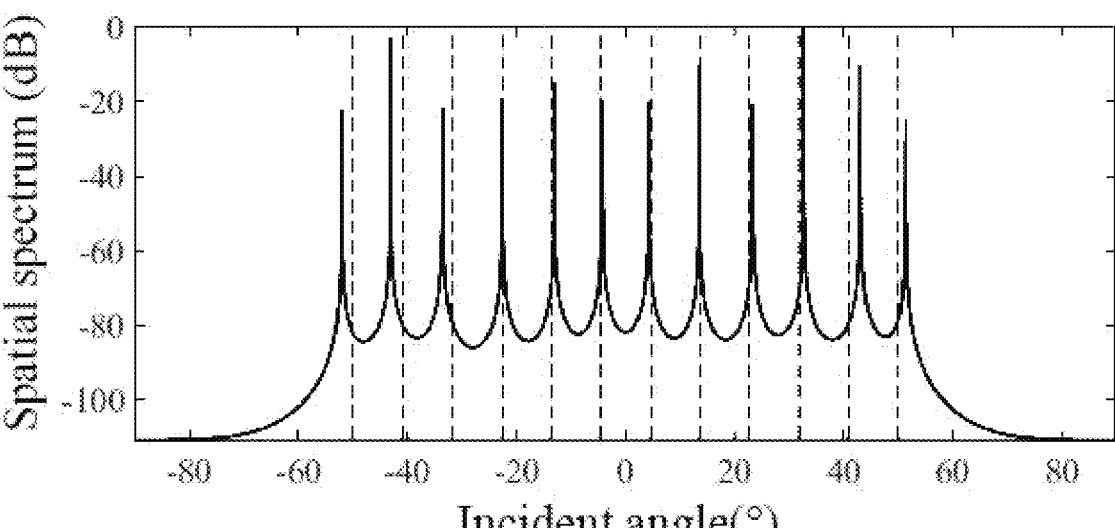
Figure 6C:
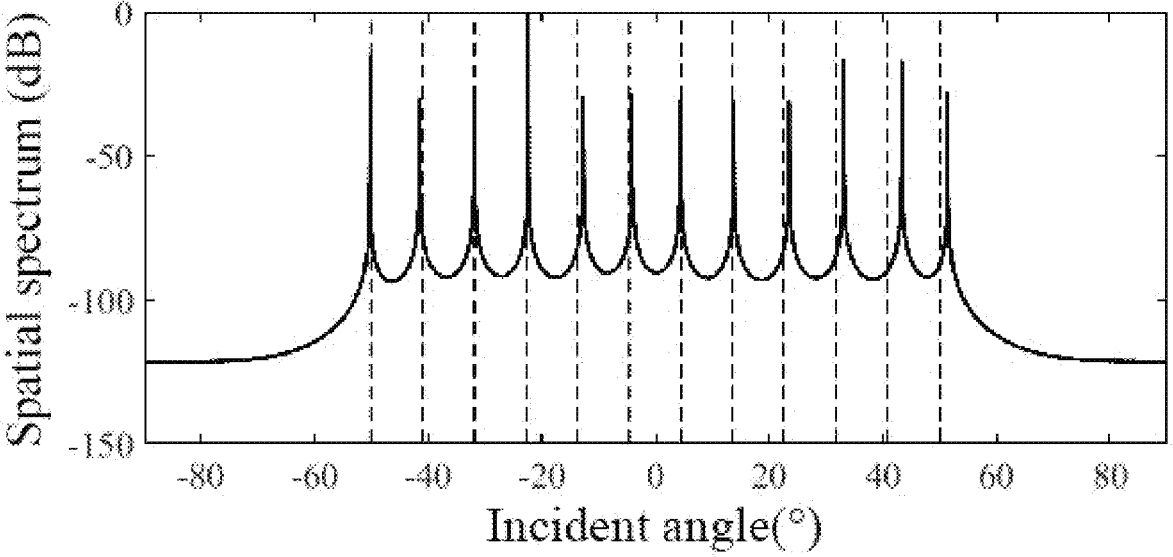
Figure 6D:
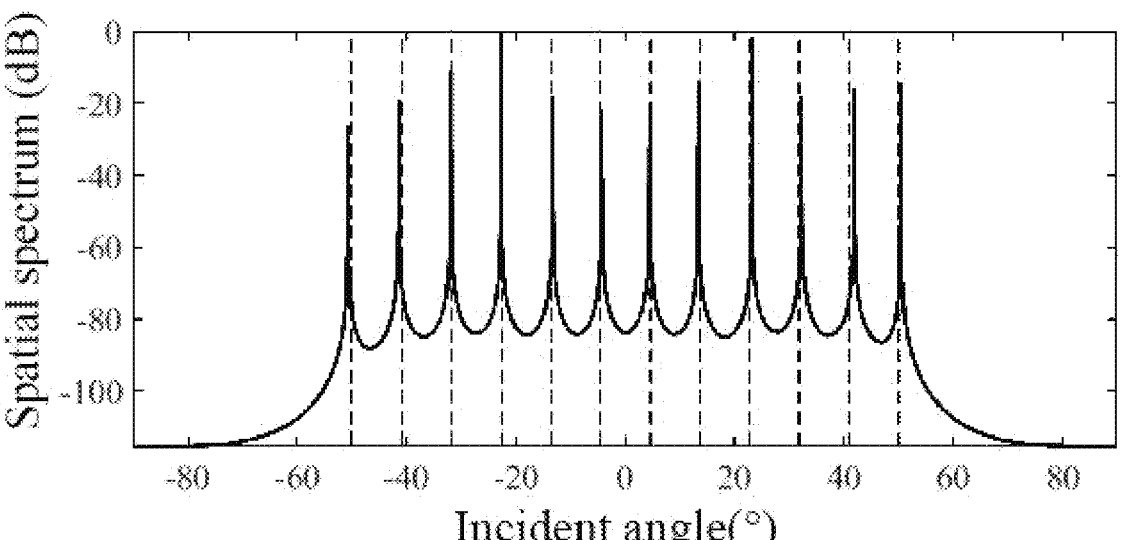

Next, the estimation performance of the technical method provided by the present disclosure is compared with that of a sparse signal reconstruction (SSR) algorithm, a virtual array-based interpolation (VAI) algorithm and a structured Nyquist correlation reconstruction (SNCR) algorithm. The resolution performance of the test algorithms is compared at first. It is ssumed that two signal sources respectively have incident angles −0.8° and 0.8° and thus have a small angular interval, and have signal noise ratios of 0 dB. As shown in FIG. 4, spatial spectra of the test algorithms are displayed. Other algorithms cannot distinguish these two closely spaced signal sources. In contrast, the technical method of the present disclosure can distinguish the two closely spaced signal sources. The comparison result indicates that the technical method provided by the present disclosure has better resolution performance.

Finally, the performance of the test methods in the estimation of multiple signal sources is compared. It is considered that the nine signal sources are uniformly distributed in the range of [−50°, 50°] and the signal noise ratio is 0 dB. Spatial spectra of the test algorithms are shown in FIG. 5A to FIG. 5D. SSR produces multiple pseudo peaks in the spatial spectrum, while the other three algorithms can accurately estimate DOA of the nine signal sources. Afterwards, the number of the signal sources is increased to L=12 to evaluate the maximum achievable degree of freedom of the technical method provided by the present disclosure. Spatial spectra of the test algorithms are shown in FIG. 6A to FIG. 6D. Apparently, except the SSR algorithm, all algorithms have successfully identified all twelve signal sources. However, the VAI algorithm produces several estimation results that obviously deviate from true directions, while the SNCR algorithm and the technical method provided by the present disclosure achieve higher estimation accuracy.

Embodiment 2

Figure 7:
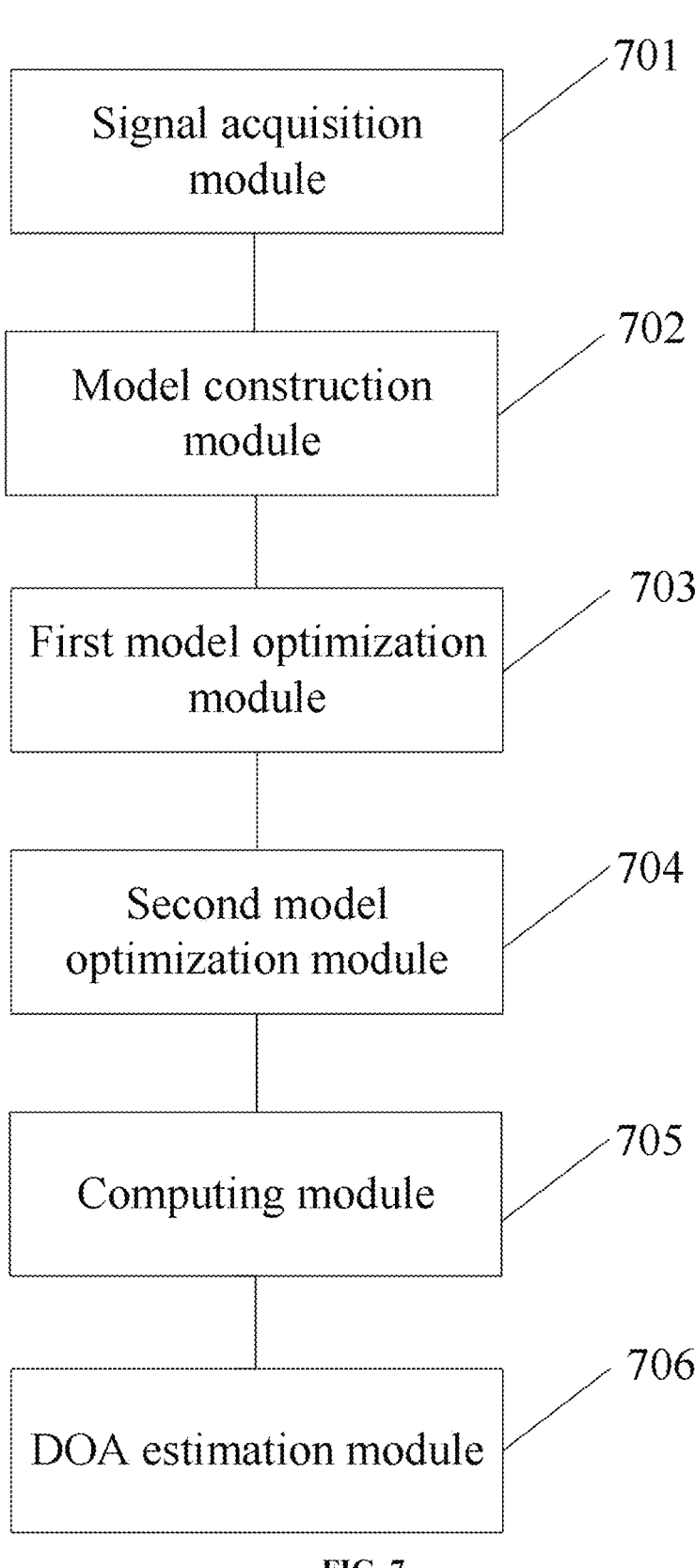
FIG. 7 is a structural diagram of a DOA estimation system for a sparse array based on Vandermonde decomposition reconstruction according to an embodiment of the present disclosure.

As shown in FIG. 7, this embodiment provides a DOA estimation system for a sparse array based on Vandermonde decomposition reconstruction, including:

a signal acquisition module 701, configured to acquire array received signals, where the array received signals include sparse array signals, and uniform linear array signals, the sparse array signals are composed of a plurality of far-field narrow-band and uncorrelated signals entering a sparse array from any directions, the uniform linear array signals are signals received by an presumed uniform linear array, and the presumed uniform linear array is obtained by transforming the sparse array through an interpolation method;

a model construction module 702, configured to construct a covariance matrix completion optimization model according to the sparse array signals and the uniform linear array signals in the array received signals, where the covariance matrix completion optimization model is a matrix completion model established by using characteristics of Vandermonde decomposition of a covariance matrix of the uniform linear array;

a first model optimization model 703, configured to introduce a nuclear norm for the covariance matrix completion optimization model to replace a rank function in the covariance matrix completion optimization model, thus obtaining an updated covariance matrix completion optimization model;

a second model optimization module 704, configured to introduce an auxiliary variable for the updated covariance matrix completion optimization model, and transform the updated covariance matrix completion optimization model into an equivalent form to obtain a solvable optimization problem;

a computing module 705, configured to solve the solvable optimization problem by an alternating direction multiplier method to obtain an optimal estimation value of a covariance matrix of the sparse array signals; and a DOA estimation module 706, configured to perform DOA estimation by using a root multiple signal classification algorithm according to the optimal estimation value of the covariance matrix of the sparse array signals.

In conclusion, the present disclosure has the following beneficial effects:

In the prior art, the sparse signal reconstruction (SSR) algorithm has the problems of basis mismatch, and poor estimation performance when the number of signal sources exceeds the number of sensors in the sparse array, and the virtual array-based interpolation (VAI) algorithm and the structured Nyquist correlation reconstruction (SNCR) algorithm may not be able to distinguish different incident signals for the signal sources with small angular intervals. When the angular interval between the incident signals is small and the number of the signal sources exceeds the number of the sensors in the sparse array, the method and system provided by the present disclosure can achieve better spatial resolution and maximize using the extra degree of freedom provided by the sparse array.

The technical features of the above embodiments can be combined at will. In order to make the description concise, not all possible combinations of the technical features in the above embodiments are described. However, it should be considered that these combinations of technical features fall within the scope recorded in this specification provided that these combinations of technical features do not have any conflicts.

Specific examples are used herein for illustration of the principles and embodiments of the present disclosure. The description of the embodiments is merely used to help illustrate the method and its core principles of the present disclosure. In addition, a person of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A method for identifying signal sources based on direction of arrival (DOA) estimation for a sparse array based on Vandermonde decomposition reconstruction, which is implemented in a system for identifying signal sources comprising a processor and a memory storing instructions to be executed by the processor to implement the method, wherein, the method comprises:

acquiring sparse array signals by a sparse sensor array, wherein the sparse array signals are composed of a plurality of far-field narrow-band and uncorrelated signals entering the sparse sensor array from any directions;

acquiring uniform linear array signals, wherein the uniform linear array signals are signals received by a presumed uniform linear array, and the presumed uniform linear array is obtained by transforming the sparse sensor array through an interpolation method;

constructing a covariance matrix completion optimization model according to the sparse array signals and the uniform linear array signals, wherein the covariance matrix completion optimization model is a matrix completion model established by using characteristics of Vandermonde decomposition of a covariance matrix of the presumed uniform linear array;

wherein constructing the covariance matrix completion optimization model comprises:

computing a covariance matrix of the sparse array signals and a covariance matrix of the uniform linear array signals;

decomposing the covariance matrix of the presumed uniform linear array into a Vandermonde matrix and a corresponding coefficient vector by using the characteristics of the Vandermonde decomposition; and constructing the covariance matrix completion optimization model according to the Vandermonde matrix and the coefficient vector;

wherein a formula expression of the covariance matrix completion optimization model is as follows:

$$\min_{U,u}\sum_{r=1}^{R}\mathrm{rank}(\mathcal{R}[\mathcal{Q}_r[U]])+\lambda\left\|\Phi\mathcal{T}(u)\Phi^H-\hat{R}_S\right\|_F^2$$

$$\text{subject to } UU^H=\mathcal{T}(u)$$

wherein $U=\mathcal{A}_{\mathbb{U}}\,\mathrm{diag}([\sigma_1,\ldots,\sigma_L])$ is a $|\mathbb{U}|\times L$-dimensional matrix, subject to is a feasible region for limiting an optimization variable, $\mathcal{T}(u)$ is a covariance matrix and is a Hermitian-Toeplitz matrix, and a first column of the covariance matrix is u, $\|\cdot\|_F$ represents Frobenius norm, $\mathcal{R}$ is a Hankel matrix transformation operator, $\lambda$ represents a wavelength of incident signals, R indicates a total number of columns, r is an $r^{th}$ column, $\mathcal{Q}_r$ is a column-extraction operator, $\Phi$ represents a $|\mathbb{S}|\times|\mathbb{U}|$-dimensional compression matrix only comprising 0 and 1, $\hat{R}_{\mathbb{S}}$ is a sample covariance matrix, H represents conjugate transpose, $A_\mathbb{U}$ is a Vandermonde matrix, and σ is a square root of power;

introducing a nuclear norm for the covariance matrix completion optimization model to replace a rank function in the covariance matrix completion optimization model to obtain an updated covariance matrix completion optimization model;

introducing an auxiliary variable for the updated covariance matrix completion optimization model, and transforming the updated covariance matrix completion optimization model into an equivalent form to obtain a solvable optimization problem;

wherein introducing the auxiliary variable for the updated covariance matrix completion optimization model to perform equivalent form transformation on the updated covariance matrix completion optimization model to obtain the solvable optimization problem comprises:

a formula expression of the solvable optimization problem is as follows:

$$\min_{U,V,u,B_r} \sum_{r=1}^{R} \|B_r\|_* + \lambda \left\| \Phi \mathcal{T}(u) \Phi^H - \hat{R}_S \right\|_F^2;$$

wherein subject to $UV^H = \mathcal{T}(u)$, $U=V$, $\mathcal{R}[\mathcal{Q}_r[U]]=B_r$, $\mathcal{Q}_r \in \{1, \ldots, R\}$;

solving the solvable optimization problem by an alternating direction multiplier method to obtain an optimal estimation value of the covariance matrix of the sparse array signals;

performing DOA estimation by using a root multiple signal classification algorithm according to the optimal estimation value of the covariance matrix of the sparse array signals; and identifying signal sources based on the DOA estimation.

2. The DOA estimation method for the sparse array based on Vandermonde decomposition reconstruction according to claim 1, wherein a formula expression of the sparse array signals is as follows:

$$x_S(t) = \sum_{l=1}^{L} a_S(\theta_l) s_l(t) + n_S(t) = A_S(\theta) s(t) + n_S(t)$$

wherein Σ represents a summation symbol, $s(t)=[s_1(t), s_2(t), \ldots s_L(t)]^T$ represents an L-dimensional signal vector, $l \in (1, L)$; t represents sampling time; $(\bullet)^T$ represents a transpose operation;

$n_S(t)$ represents a $|S|$-dimensional independent and identically distributed complex-valued additive Gaussian noise vector;

$A_S(\theta)=[a_S(\theta_1), a_S(\theta_2), \ldots a_S(\theta_L)]$ represents a $|S| \times L$-dimensional array manifold matrix; and $a_S(\theta_1)$ is a $|S|$-dimensional steering vector with an angle of $\theta_l$.

3. The DOA estimation method for the sparse array based on Vandermonde decomposition reconstruction according to claim 2, wherein a formula expression of the uniform linear array signals is as follows:

$$x_\mathbb{U}(t) = \sum_{l=1}^{L} a_\mathbb{U}(\theta_l) s_l(t) + n_\mathbb{U}(t) = A_\mathbb{U}(\theta) s(t) + n_\mathbb{U}(t)$$

wherein $n_\mathbb{U}$ is a $|S|$-dimensional noise vector; $A_\mathbb{U}(\theta)=[a_\mathbb{U}(\theta_1), a_\mathbb{U}(\theta_2), \ldots, a_\mathbb{U}(\theta_L)]$ represents a $|S| \times L$-dimensional array manifold matrix; and $a_\mathbb{U}(\theta_l)$ represents a $|\mathbb{U}|$-dimensional steering vector with an angle of $\theta_l$.

4. The DOA estimation method for the sparse array based on Vandermonde decomposition reconstruction according to claim 3, wherein computing the covariance matrix of the sparse array signals comprises:

computing the covariance matrix of the sparse array signals according to a formula $$R_S = \mathbb{E}\left\{ x_S(t) x^{\frac{H}{S}}(t) \right\} = A_S(\theta) P A^{\frac{H}{S}}(\theta) + \sigma^{\frac{2}{n}} I$$

wherein $\mathbb{E}\{\bullet\}$ represents mathematical expectation, $$P = \text{diag}\left( \left[ \sigma^{\frac{2}{1}}, \sigma^{\frac{2}{2}}, \ldots, \sigma^{\frac{2}{L}} \right] \right)$$

represents a signal covariance matrix, diag(•) represents a diagonal matrix generated by taking elements of one vector as diagonal elements;

$$\sigma^{\frac{2}{l}}$$

represents power of an $l^{-th}$ signal, $$\sigma^{\frac{2}{n}}$$

is a noise term, and H represents conjugate transpose.

5. The DOA estimation method for the sparse array based on Vandermonde decomposition reconstruction according to claim 4, wherein computing the covariance matrix of the uniform linear array signals comprises:

computing the covariance matrix of the uniform linear array signals according to a formula $$R_\mathbb{U} = \mathbb{E}\left\{ x_\mathbb{U}(t) x^{\frac{H}{\mathbb{U}}}(t) \right\} = A_\mathbb{U}(\theta) P A^{\frac{H}{\mathbb{U}}}(\theta) + \sigma^{\frac{2}{n}} I = R_{\mathbb{U}s} + \sigma^{\frac{2}{n}} I;$$

wherein $R_{\mathbb{U}s}$ represents a noise-free covariance matrix of $\mathbb{U}$.

6. The DOA estimation method for the sparse array based on Vandermonde decomposition reconstruction according to claim 5, wherein the root multiple signal classification algorithm is as follows:

$$P_{MUSIC}(\theta) = \frac{1}{a^H(\theta) U_N U_N^H a(\theta)},$$

wherein $U_N$ represents a noise sub-space of $\mathcal{T}(u)$, and $a(\theta)$ represents a steering vector.

* * * * *